Nov. 12, 1940. W. F. GROENE ET AL 2,221,049
WORK LOADING MECHANISM FOR LATHES
Filed Nov. 18, 1939 12 Sheets-Sheet 1
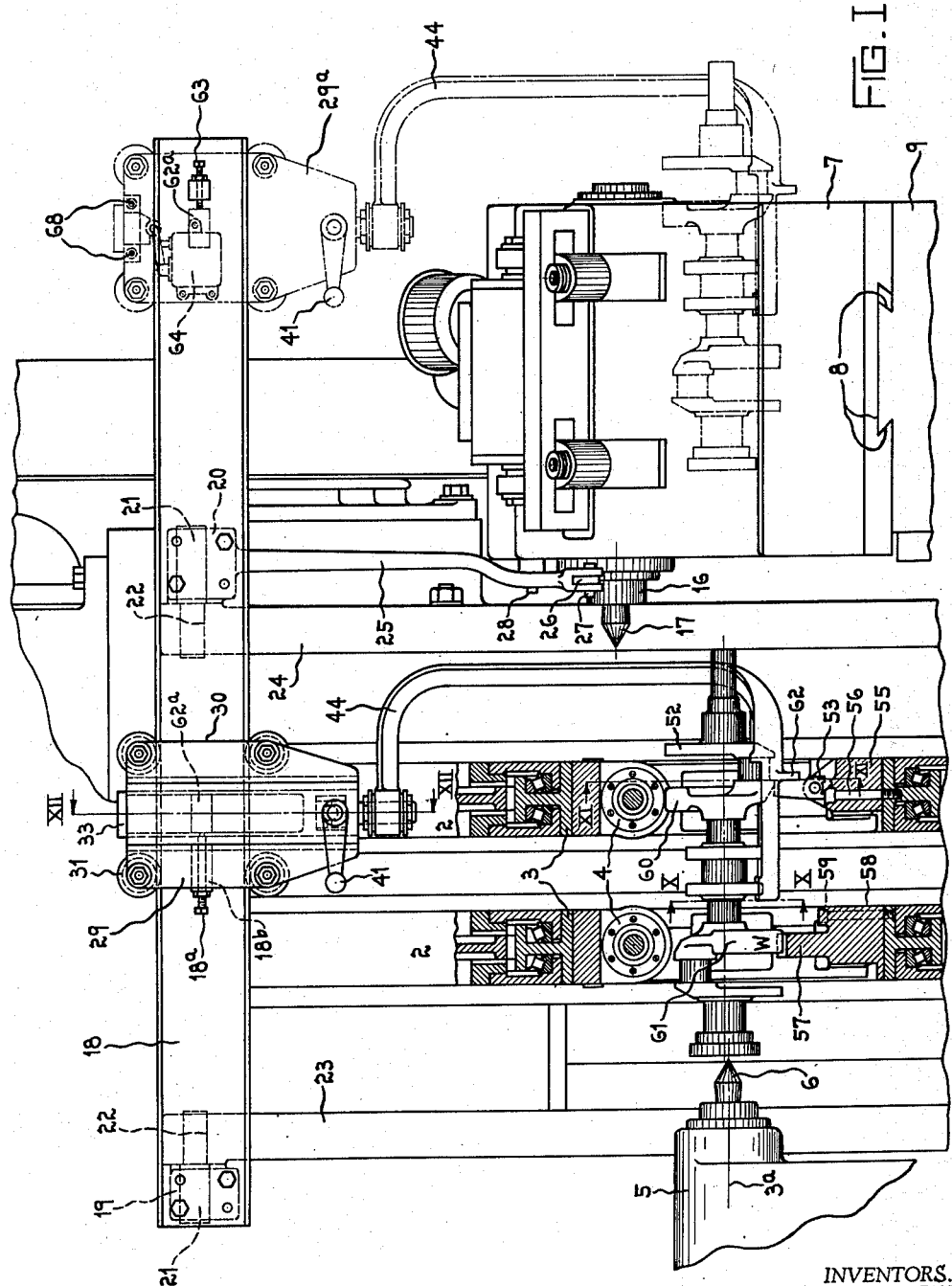
FIG. I
INVENTORS.
WILLIAM F. GROENE
HAROLD J. SIEKMANN
BY Willard S. Groene
ATTORNEY.

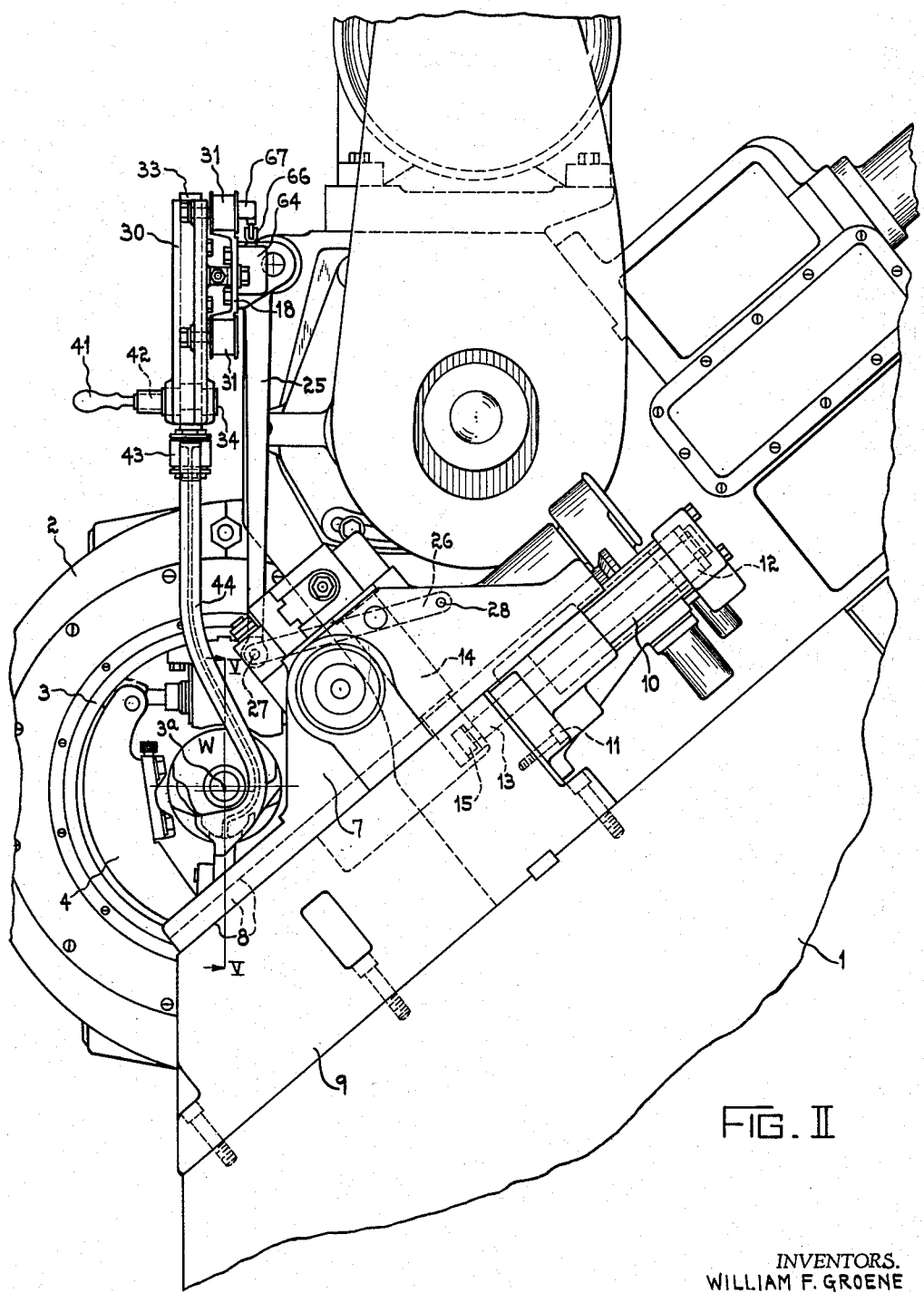

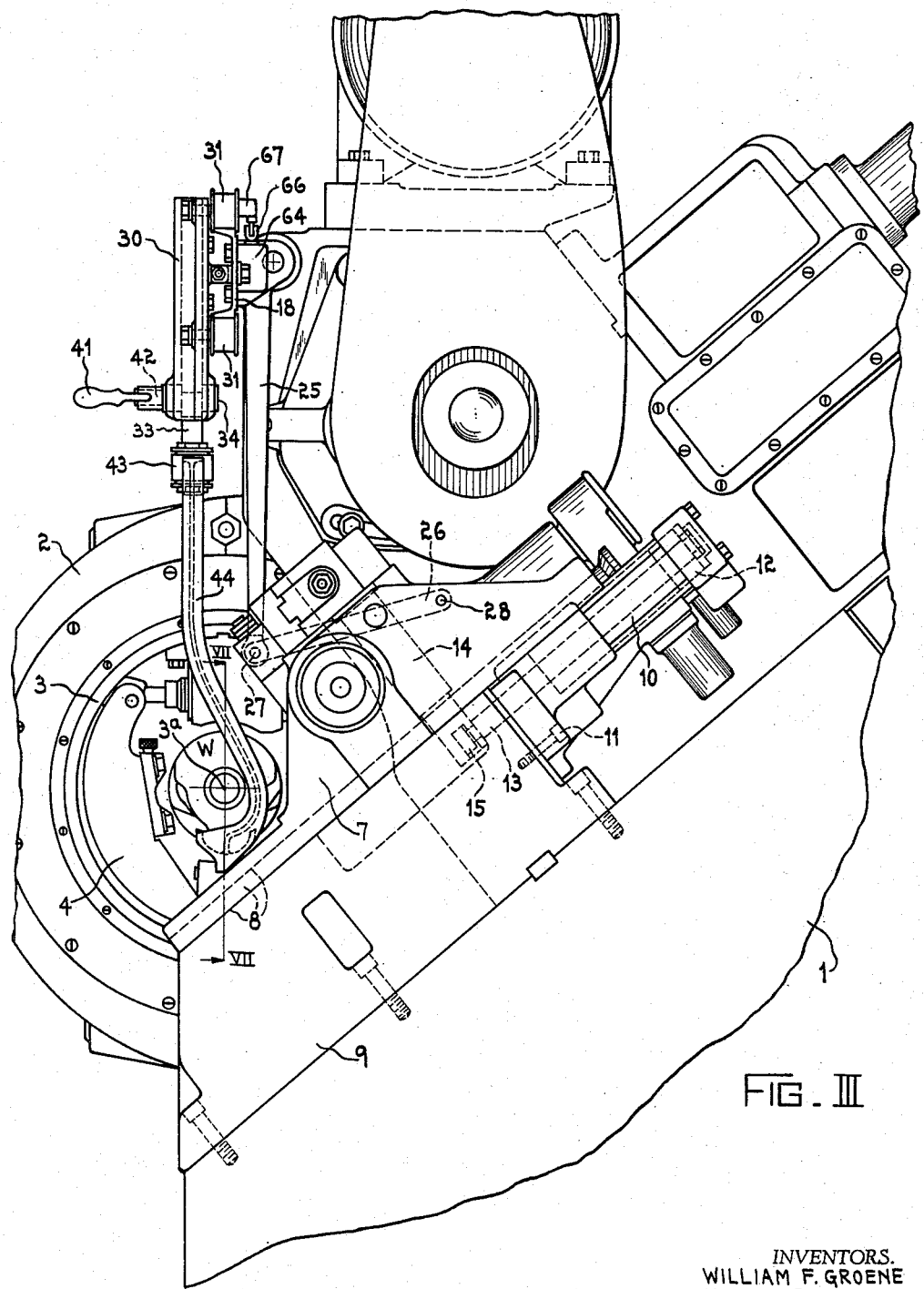
FIG. III

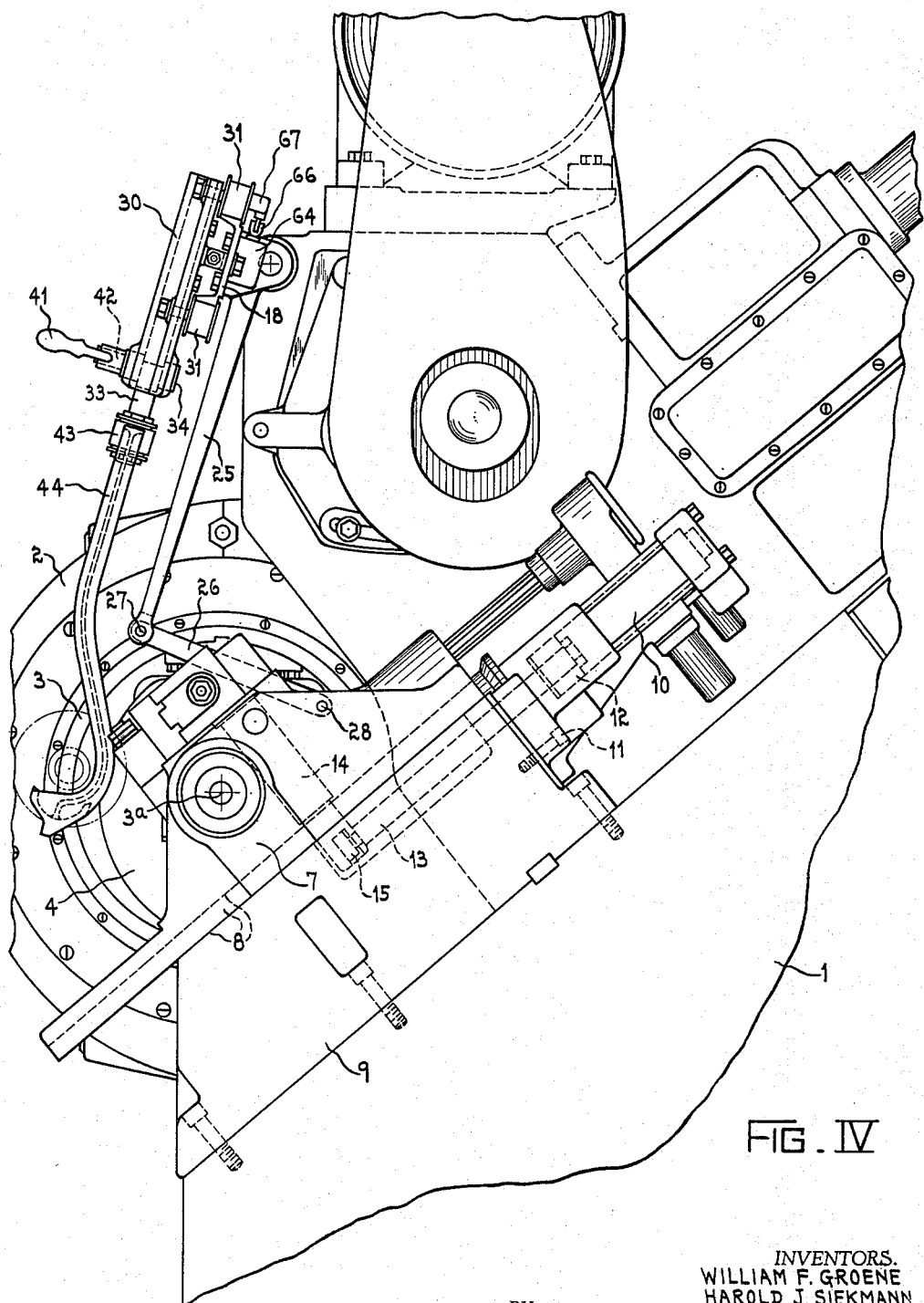
FIG. IV

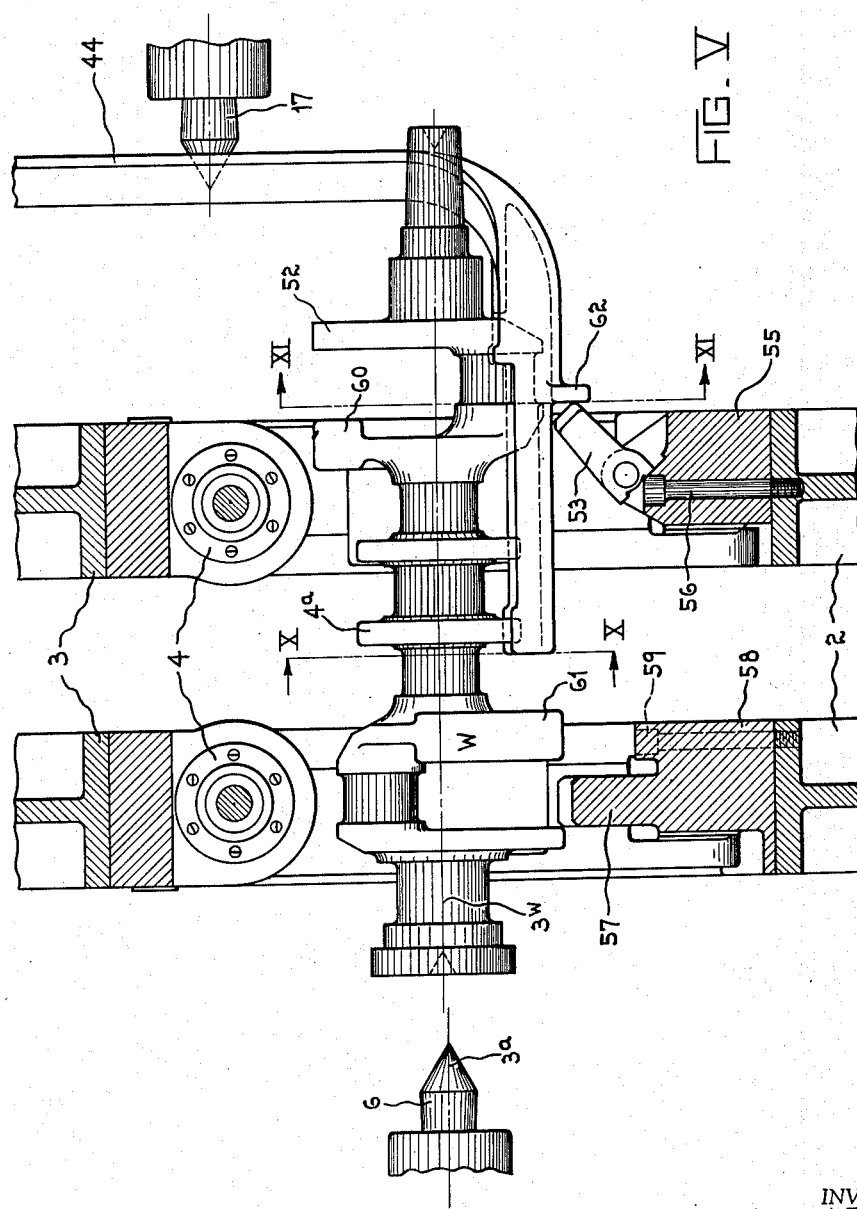

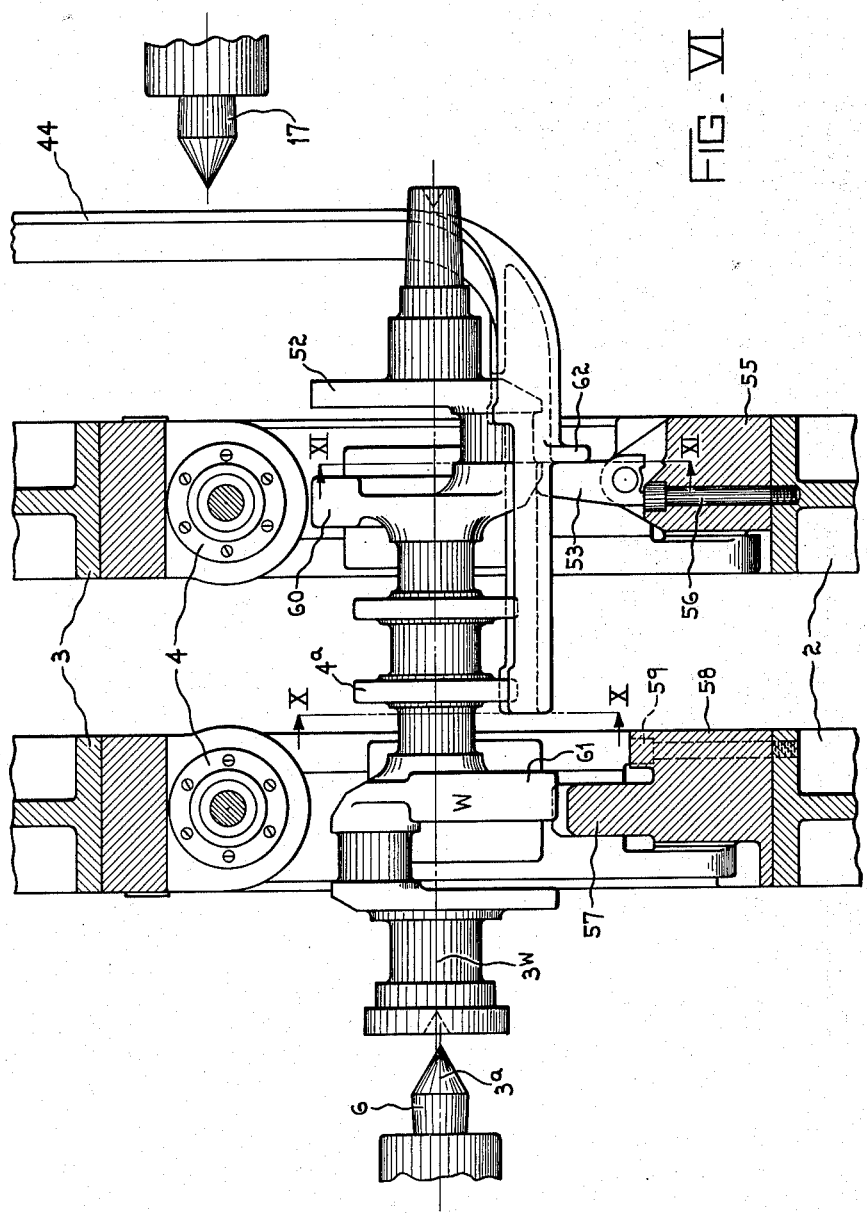

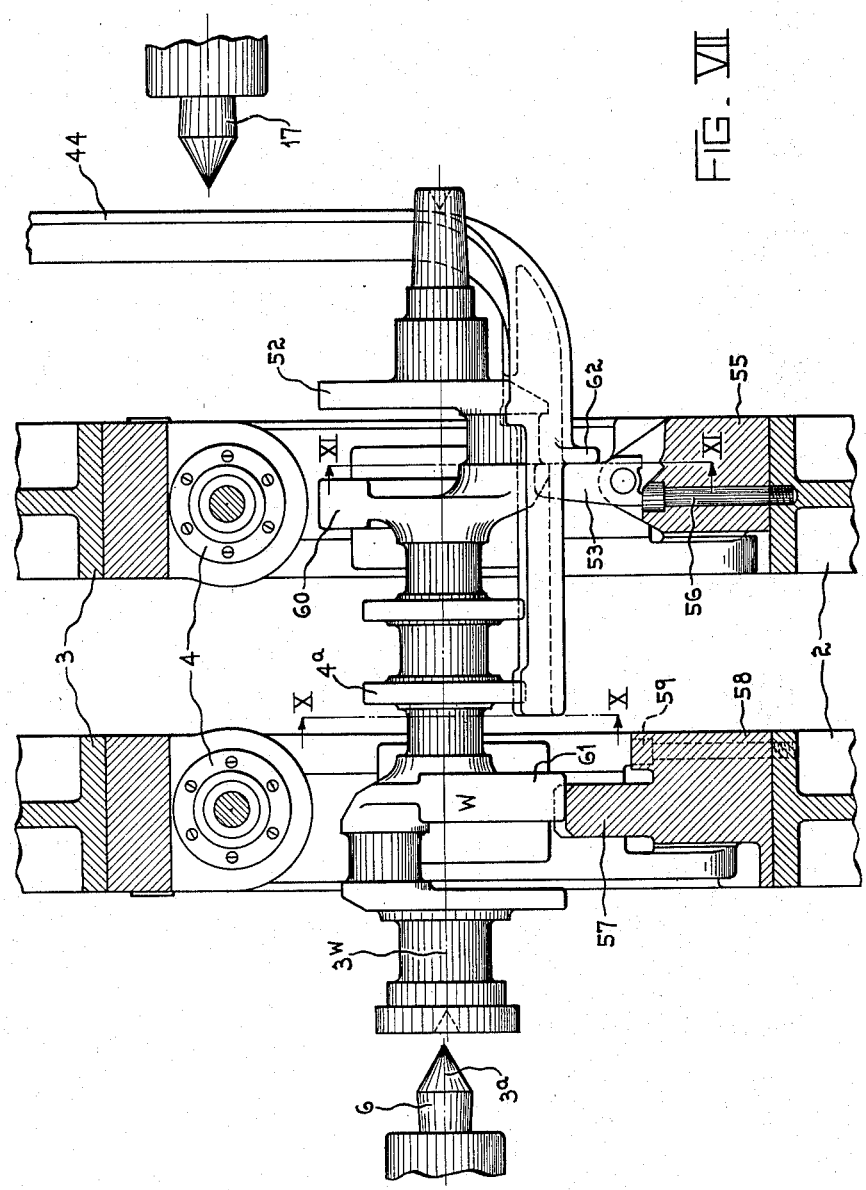

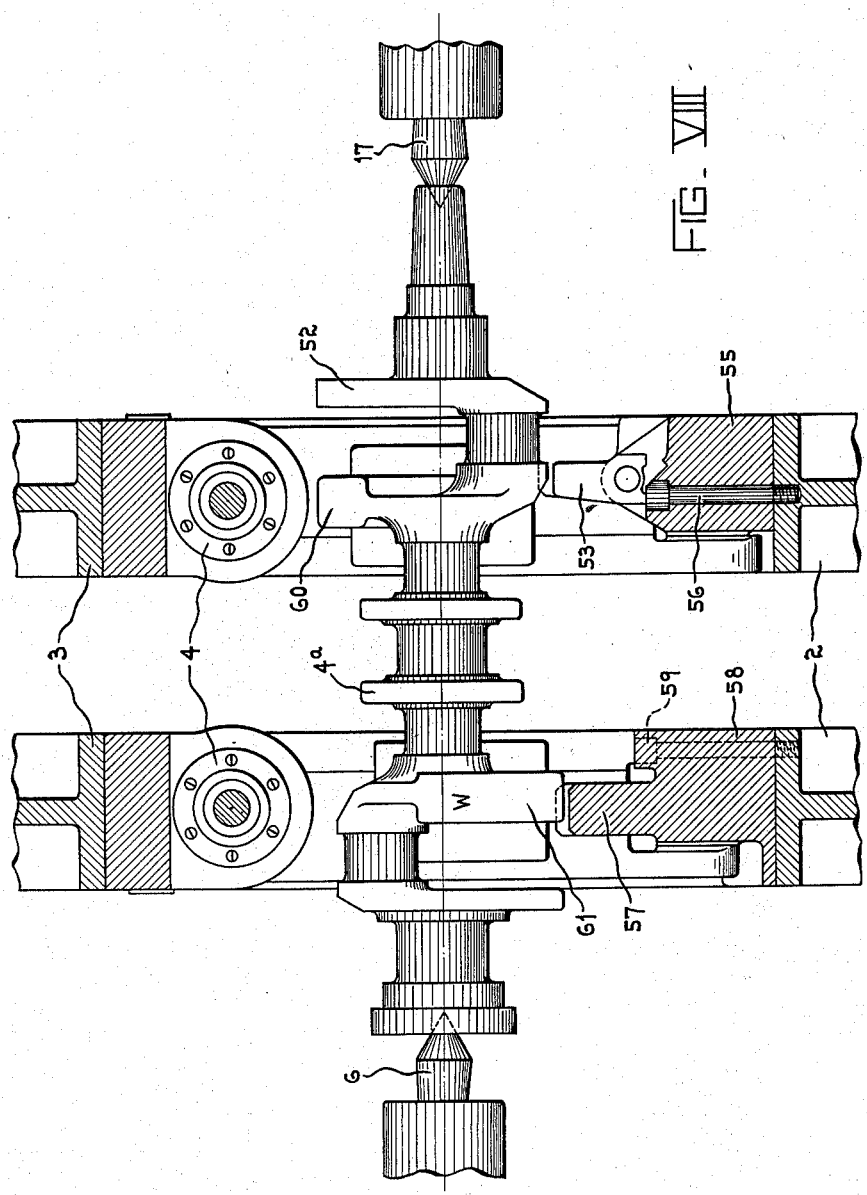

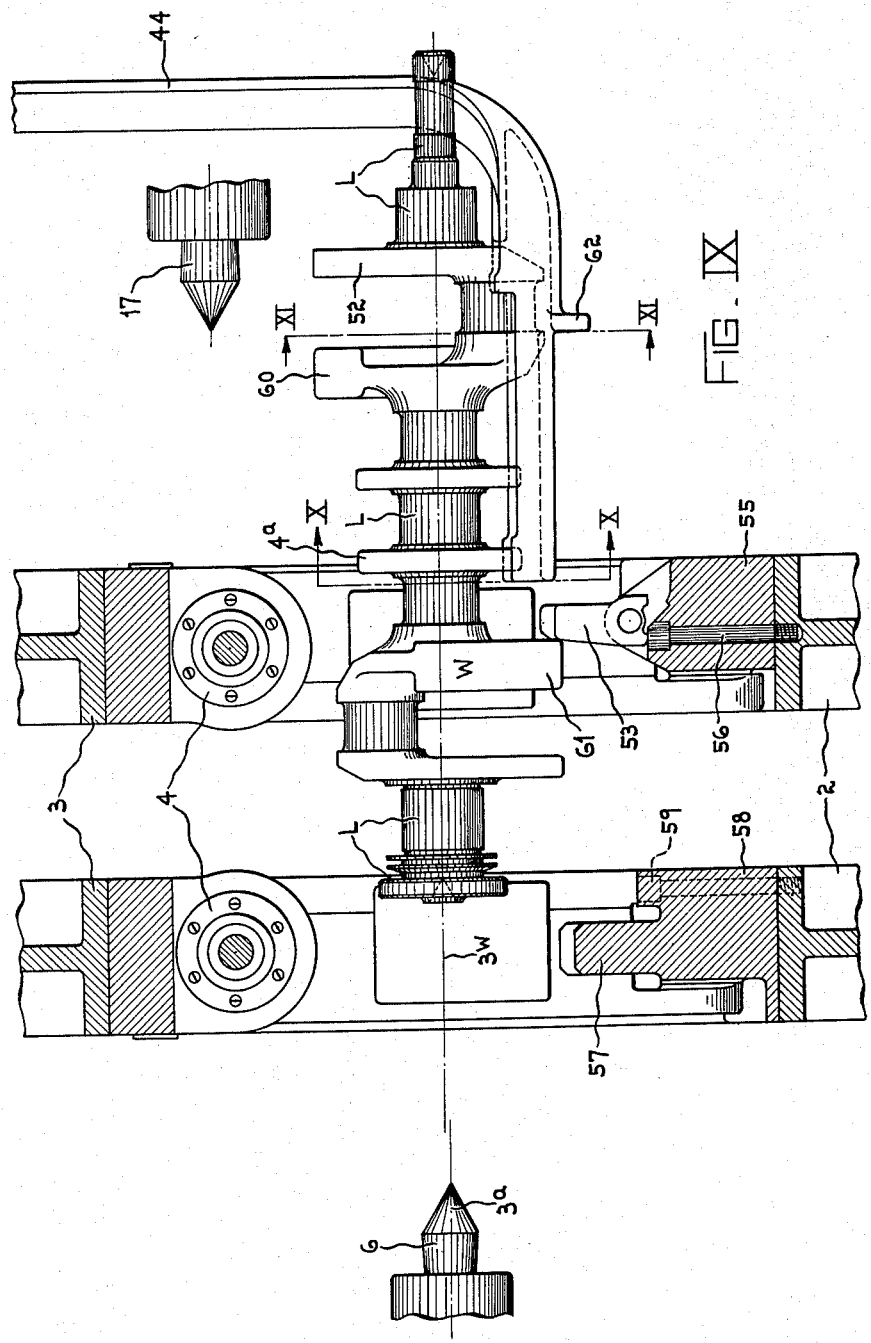

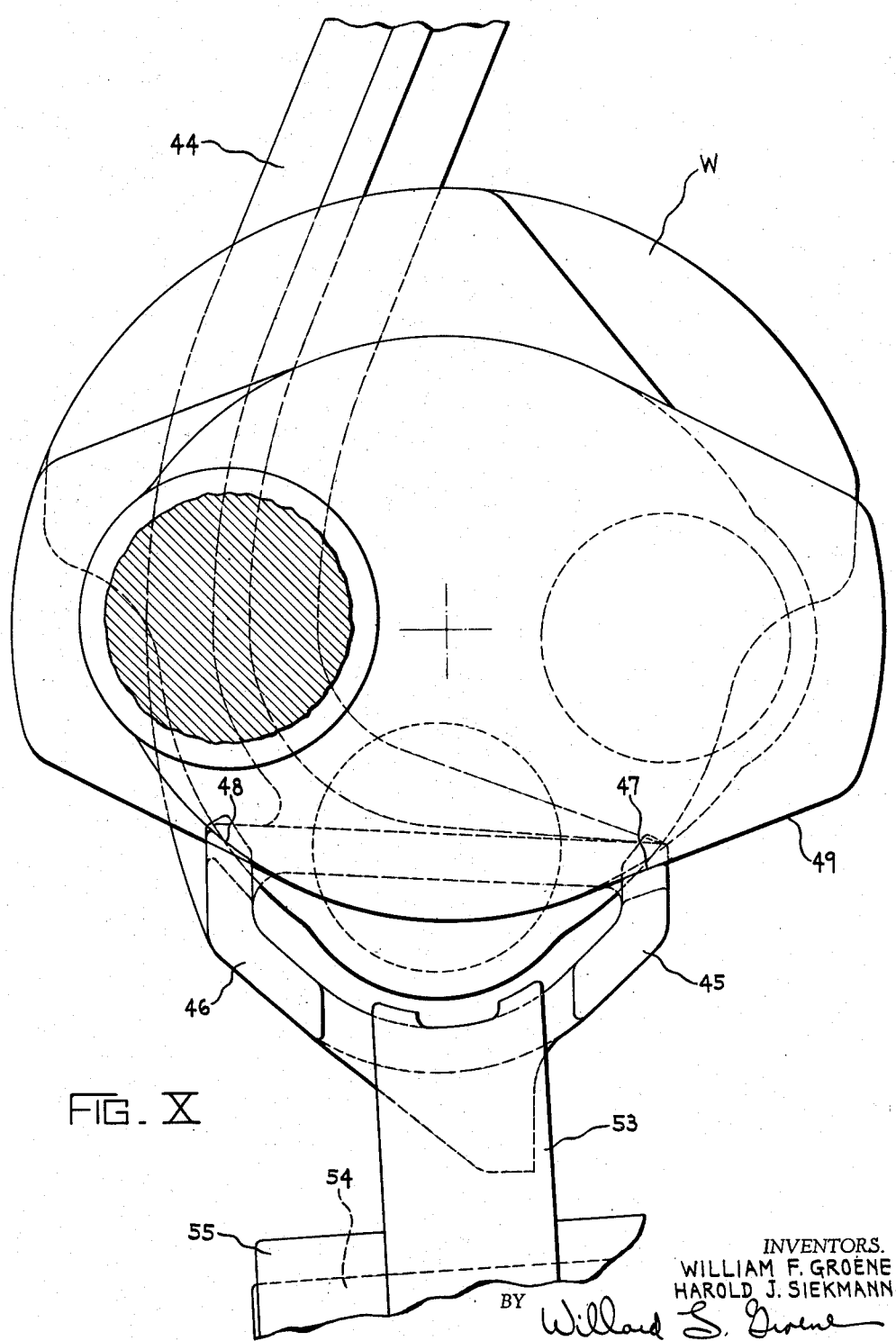

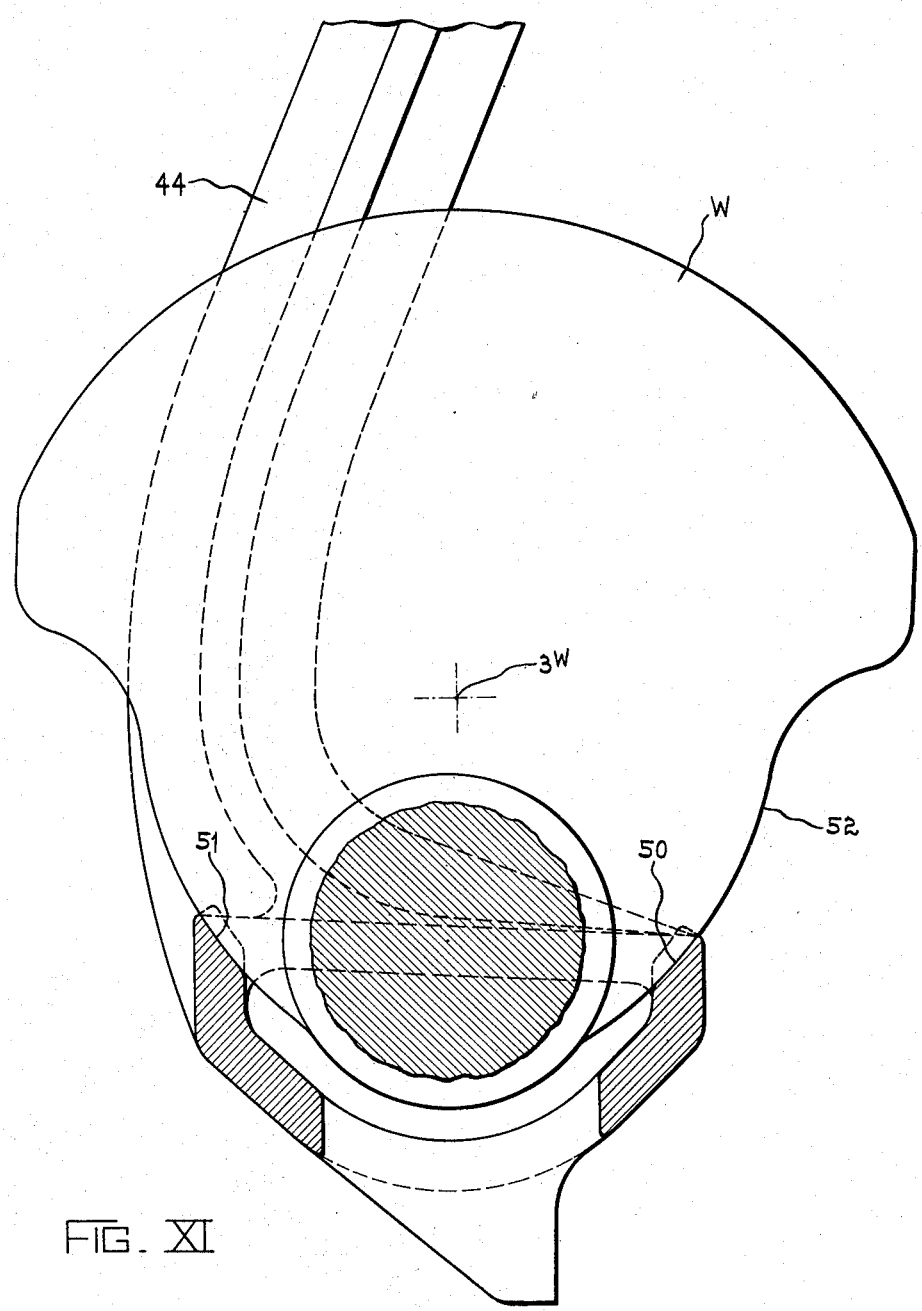

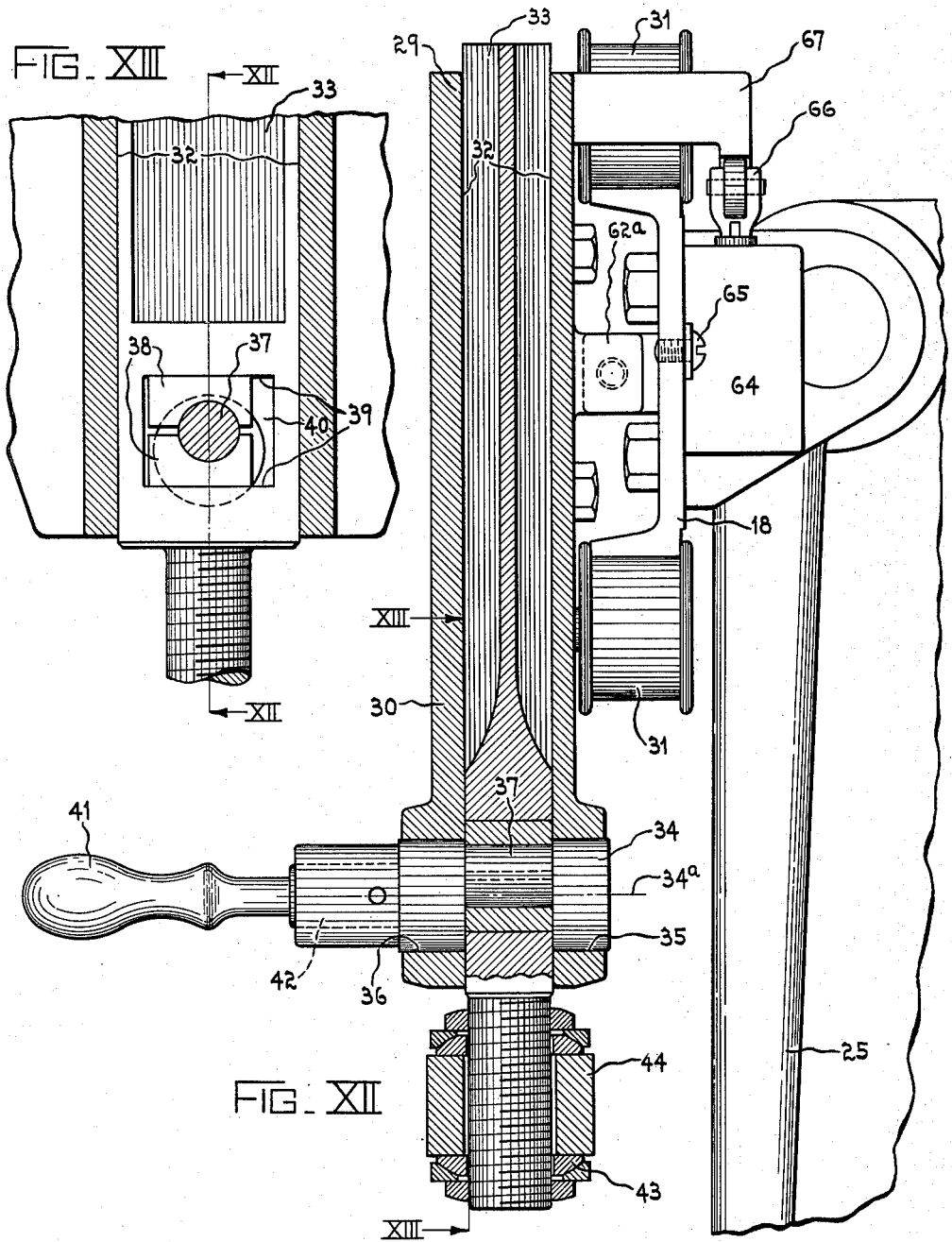

Patented Nov. 12, 1940

2,221,049

UNITED STATES PATENT OFFICE

2,221,049

WORK LOADING MECHANISM FOR LATHES

William F. Groene and Harold J. Siekmann, Cincinnati, Ohio, assignors to The R. K. Le Blond Machine Tool Company, Cincinnati, Ohio, a corporation of Delaware Application November 18, 1939, Serial No. 305,142

16 Claims. (Cl. 82—1)

This invention pertains to certain improvements and additions to loading and unloading devices for center drive crankshaft lathes of a character shown in Patent 1,700,721 dated January 21, 1929; 1,843,359 dated February 2, 1932; and 2,069,107 dated January 26, 1937. More particularly this invention pertains to certain improvements in loading devices of the above character which are applied to center drive lathes in which the tailstock or tailstocks are moved relative to the center drive chucking mechanism in loading or unloading work in such lathes, for example, lathes of a type shown in co-pending application, Serial Number 209,738, filed May 24, 1938 and Serial Number 271,304, filed May 2, 1939.

One of the objects of this invention is to provide a loading and unloading arrangement for work in a center drive lathe which carries the work in a cradle held rigidly on a movable loading crane for moving the work axially into the chucking mechanism of the lathe and there to deposit the work on suitable supports in the chucking device from which the work may be engaged by the centers and chucking devices of the lathe for final gripping and positioning of the work independent of these supports for the turning operations to be performed on the work piece.

Another object of this invention is to provide a loading and unloading mechanism for a lathe in which the work is placed in a forked hook which is free to pass into the chucking devices of the lathe for depositing the work piece on suitable supports in these chucking devices. These supports cooperate with the hook of the loading crane to initially position the work piece in the lathe for effective engagement by the chucking mechanism of the lathe preparatory to beginning the turning operations on the work piece.

Another object of this invention is to provide a mechanism of this character which is adaptable to lathes having a tailstock which is movable to and from axial alignment with the axis of rotation of the lathe at the time of loading and unloading work in the lathe.

Another object of this invention is to provide a loading mechanism of this character which may be moved out of alignment with the axis of rotation of the lathe in accordance with the movement of a movable tailstock of the lathe so as to automatically prevent interference between the loading mechanism and the tailstock and chucking mechanism of the lathe. Furthermore specific objects and advantages of this invention will appear from a detailed description of the drawings in which:

Fig. I is a front elevation of a double center drive crankshaft line bearing lathe having a movable right hand tailstock which incorporates a loading mechanism having the features of this invention.

Fig. II is a right hand end elevation of the lathe shown in Fig. I showing the position of the loading mechanism at the time of placement of work on or removing work from the loading crane hook.

Fig. III is a right hand end elevation of the machine shown in Fig. I but with the loading crane moved to the left as shown in Fig. I with the work deposited on the work supporting members in the chucking devices in the center drive ring gears.

Fig. IV is a right hand end elevation of machine shown in Fig. I indicating the position of the loading crane mechanism during the turning operation on the work in which the tailstock is moved into axial alignment to bring its center in supporting position for engagement with the work piece being turned.

Fig. V is an enlarged section substantially on the line V—V of Fig. II showing the position of the crane hook, work piece, and chucking mechanism of the lathe as the work is being axially entered into the center drive ring gears.

Fig. VI is an enlarged sectional view of the center drive mechanism of the lathe substantially on the line V—V of Fig. II showing the crankshaft fully inserted into the center drive chucking devices.

Fig. VII is an enlarged sectional view substantially on the line VII—VII of Fig. III showing the crane hook released from the work piece to deposit it upon the supports in the chucking devices preparatory to engagement of the work by the chucking devices and the centers of the lathe.

Fig. VIII is an enlarged sectional view substantially on the line VII—VII of Fig. III showing the work piece engaged by the centers and the chucking devices of the lathe.

Fig. IX is an enlarged sectional view through the center drive chucking mechanism substantially on the line V—V of Fig. II showing the work piece being withdrawn from the chucking devices of the lathe at the completion of the turning operation.

Fig. X is a cross section through the crankshaft and the crane hook on the line X—X of Figs. I, V, VI, VII, and IX.

Fig. XI is a cross section through the crankshaft and loading hook on the line XI—XI of Figs. I, V, VI, VII, and IX.

Fig. XII is a vertical transverse section through the loading frame on the line XII—XII of Fig. I.

Fig. XIII is a sectional view through the eccentric raising and lowering mechanisms for the crane hook on the line XIII—XIII of Fig. XII.

For illustrative purposes we have shown our invention applied to a double center drive crankshaft lathe having a base 1, upon which are mounted the center drive housings 2 carrying the rotatable ring gears 3 containing the chucking devices 4, for example, of a character shown in co-pending application Serial Number 299,560 filed October 14, 1939.

In this particular illustration the tailstock 5 is fixed on the base 1 and has the usual axially movable center 6 adapted to engage the end of a work piece or crankshaft W. The movable right hand tailstock 7 is slidably mounted on dovetail guide ways 8 on the support 9 fixed on the base 1 whereby it may be reciprocated to or from aligned work engaging position radially of the axis of rotation of the center drive chucking devices 4. This motion may be effected by a suitable fluid pressure cylinder 10, fixed on the support 9 by screws 11, through its pistons 12, rod 13, and the stud 14, to which the rod 13 is suitably connected at 15, fixed in the tailstock 7. The barrel 16 and center 17 of this tailstock 7 may be actuated axially and clamped to the tailstock 7 by fluid pressure for engaging and disengaging the work W at the proper time, for example, in a manner illustrated in the above co-pending application Serial Number 212,326.

It is to be understood that either or both of the tailstocks 5 and 7 may be made movable. In instances where both of the tailstocks are movable two cranes or loading devices are utilized, as in Patent 2,069,107, with the features of this invention. The loading crane (or cranes) 29 is mounted for horizontal movement on a rail 18 to which is fixed the brackets 19 and 20 having studs 21 fixed therein and journaled in bearings 22 in suitable upright supports 23 and 24 of the machine frame. The bracket 20 has an integral downwardly extending arm 25 which is connected by means of the link 26 and associated pins 27 and 28 to the tailstock 7 so that as this tailstock is reciprocated on the guide ways 8 the rail 18 may be swung about a horizontal axis confined by the stud 21.

The crane 29 comprises a plate 30 (Fig. XII) which is carried on rollers 31 for horizontal movement along the rail 18. Carried on the plate 30, in appropriate guide ways 32, is a vertically reciprocatably lifting bar 33 which is actuated by the eccentric crankshaft 34 journaled in suitable bearings 35 and 36 in the plate 30. The crank pin 37 of this crankshaft is journaled in suitable half shoes 38, which are slidably mounted between the surfaces 39 of the square slot 40 formed in the lifting bar 33 as best shown in Fig. XIII. This crankshaft may be rotated approximately a half turn of the lifting handle 41 suitably fixed to it at 42, thus by rotating the handle from one side to the other of the crane the lifting bar may be raised or lowered an amount equal to the stroke of the crankshaft 34. On the lower end of this bar 33 is suitably mounted the crane hook 44 by a suitable universally adjustable connection 43 which is utilized to effect rapid and easy accurate adjustment of the hook relative to the work and chucking devices. This hook has no relative movement after such adjustment with respect to the crane 29 or the lifting bar 33 and is therefore rigidly fixed thereon and is therefore free to swing outwardly as shown in Fig. IV when the crane device is moved to the right, as shown in Fig. I, out of the chucking devices as the tailstock moves into axial alignment with the chuck when engaging the work to be turned. This swinging movement of the crane and hook device is automatically effected by the interconnection between the tailstock 7 and the rail 18 through the leverage mechanism already described.

On the lower portion of the hook 44 is the bifurcated work engaging cradle portion best shown in Figs. I, V, VI, VII, IX, X and XI. This bifurcated work engaging cradle portion has horizontally extending members 45 and 46 each of which have the respective work engaging surfaces 47 and 48 which engage the web 49 of the crankshaft W. These portions 45 and 46 also have the respective work engaging surfaces 50 and 51 which engage the web 52 of this crankshaft W whereby the crankshaft is carried in proper balance on the hook 44 while the crane device is moved along the rail 18 to axially load the crankshaft W into or out of the center drive chucking devices while the axis $3w$ of the crankshaft is maintained substantially coincident with the axis $3a$ of rotation of the chucking devices and the centers of the lathe. These portions 45 and 46 of the hook 44 are arranged to pass each side of the work support 53, Fig. X, which is carried in the right hand ring gear 3 on the suitable pin 54 fixed in a bracket 55 attached to the ring gear above mentioned by suitable screws 56. In the left hand ring gear 3 is also provided a work receiving support 57 which is an integral part of a block 58 secured to the left hand ring gear 3 by suitable screws 59. The work receiving support 53 is arranged to be engaged by the web 60 of the crankshaft W while the work receiving support 57 is arranged to be engaged by the web 61 of the crankshaft W. On the bottom of this cradle portion of the hook 44 is a projecting lug 62 which is arranged to automatically swing the support 53 from the tilted position shown in Fig. V to the vertical position shown in Fig. VI as the crane device loads the work axially into the center drive ring gear 3.

The operation of this loading device is substantially as follows:

With the tailstock 7 moved upwardly out of axial alignment with the work spindle axis $3a$ as shown in Figs. I and II, and with the loading crane 29 moved to the right to the position $29a$ Fig. I, so that its abutment block $62a$ is back against the abutment screw 63 fixed on the rail 18, the loading hook 44 is then in position for the placement or removal of work therefrom. Assuming the lathe to be unloaded and that a rough work piece is about to be loaded in the lathe, the crankshaft W is placed on the bifurcated cradle portion of the hook 44 with its webs 60 and 61 resting respectively on the abutments 47 and 48, and 50 and 51. The hook 44 at this time is in the raised position with the lifting handle 41 in the left hand position so that the crank pin 37 is above the main axis of rotation 34a of the crankshaft 34. Under these conditions the crane is then rolled along the rail to the left Fig. I so as to axially move the crankshaft W into the center drive chuck as shown in Figs. V and VI to a definite axial position against the stop screw 18a in the block 18b fixed on the rail 18. As this hook proceeds to the left its lug 62 strikes the pivoted support 53 and moves it from the diagonal position shown in Fig. V to the vertical position shown in Fig. VI by the time the hook has fully inserted the crankshaft into the center drive chuck 3.

Having thus placed the work piece in the center drive chuck the lifting control lever 41 is then manipulated so as to swing it to the right, Fig. III, to thereby lower the hook 44 downwardly releasing engagement of the abutments 47 and 48 and 50 and 51 of the cradle portion of the hook while depositing the crank shaft W with its webs 60 and 61 respectively on the supports 53 and 57 in the center drive chucks 3. The hook 44 and crane device 29 under these conditions is now able to be withdrawn axially to the right without interference or movement of the crankshaft now initially positioned on the supports 53 and 57. The crane device is then moved to the extreme right position, as shown in Fig. I, and fluid pressure appropriately applied to the cylinder 10 and to the tailstock barrel 16 to bring this tailstock in to work engaging position shown in Figs. IV and VIII, the crane device being automatically swung out of interfering position, as shown in Fig. IV, by means of the interconnected linkage operating through the arm 25 which automatically rocks the rail 18 in accordance with the movements of the tailstock. As the center 17 of this movable tailstock 7 comes into engagement with the work it pushes it to the left into proper engagement with the center 6 and thereby raises the work piece W up off of the supports 53 and 57 so that these supports in no way affect the proper centering of the crankshaft or the proper operation of the chucking devices in the ring gear for gripping the work to hold it in accurate prelocated position on the axis 3a of the lathe.

After the centers 6 and 17 and the chucking devices 4 in the ring gear 3 have been appropriately engaged with the work piece W, the turning of the line bearings L may then be proceeded with to machine them down to the dimensions shown in Fig. IX. Having completed this machining operation the centers are then disengaged from the crankshaft W by withdrawal in this particular instance of the right hand tailstock 7 as described and disengaging the chucking devices 4 from the work piece. This causes the crankshaft W to again drop down and come to rest upon the work support 53 and 57 as shown in Fig. VII. The crane device 29 is then run in from the right with its hook moved to the position shown in this Fig. VII. The lifting lever 41 is then actuated and swung to the left to cause the hook to raise engaging the webs 49 and 52 of the crankshaft picking it up off of the work supports 53 and 57. The crane is then moved to the right as shown in Fig. IX and in so doing this causes the web 61 of the crankshaft W to strike the abutment 53 knocking it over to the diagonal position shown in Fig. V. After the crane has been thus fully withdrawn to the right position shown in Fig. I the completed work piece may then be lifted from the hook 44 and a rough unfinished work piece placed thereon. The crane device is then moved to the left again to reinsert the unfinished work piece in to the chucking device 4 to resume the cycle of operation just described.

A safety feature is incorporated in this loading arrangement to prevent inadvertent operation of the ring gear 3 at the time the loading crane is inserting or removing a work piece from the chucking devices therein. This mechanism comprises a limit switch 64 fixed on the rail 18 by suitable screws 65 and which has an operating arm 66 adapted to be engaged by a dog 67 fixed on the crane device 29 by the screws 68. This limit switch is so arranged as to be normally open except when its actuating arm 66 is engaged by the trip dog 67 on the crane device. It will be noted in Fig. I that this limit switch is so placed that it can only be so actuated to render it effective at a time when the crane is fully withdrawn to the right position shown in this Fig. I. By appropriate electrical control means interconnected with this limit switch 64 the main drive electrical power for rotating the ring gears 3 can only be rendered effective when this limit switch is actuated by the trip dog 67 of the crane so that at no time may the ring gears be rotated when the loading crane has its hook inserted in the center drive ring gears 3 for loading or unloading the work.

Having thus fully set forth and described our invention what we claim as new and desire to secure by United States Letters Patent is:

1. A work loading device for machine tools comprising means for rigidly supporting a work piece while moving it axially of a chucking device to deposit said work piece in said chucking device, work supporting means in said chucking device to receive said work piece when deposited in said chucking device, work gripping members associated with said chucking device arranged to grip said work, and before removing said work from engagement with said supporting means when said gripping members engage said work.

2. A work loading device for machine tools comprising means for rigidly supporting a work piece while moving it axially of a chucking device to deposit said work piece in a definite axial position in said chucking device, work supporting means in said chucking device to receive said work piece when deposited in said chucking device, work gripping members associated with said chucking device arranged to grip said work, and means for removing said work from engagement with said supporting means when said gripping members engage said work.

3. A work loading device for machine tools comprising a rail arranged substantially parallel with a work spindle axis of said machine tool, a loading crane mounted for movement along said rail, a work engaging member movably mounted on said crane for movement perpendicular to said work spindle axis, a work spindle in said machine tool, a chucking device on said work spindle, a work support in said chucking device cooperating with said work engaging member to receive work deposited in said chucking device by said loading device, means in said chucking device for gripping said work, and means for removing said work from engagement with said supporting means when said gripping members engage said work.

4. A work loading device for machine tools comprising a rail arranged substantially parallel with a work spindle axis of said machine tool, means for swinging said rail in a plane substantially perpendicular to said axis, a loading crane mounted for movement along said rail, a work carrying member movably mounted on said crane for movement substantially radially of said work spindle axis, a work spindle in said machine tool, a chucking device on said work spindle, a work support in said chucking device cooperating with said work engaging member to receive work deposited thereon by radial movement of said work carrying member, and means in said chucking device for gripping said work while removing it from engagement with said supporting means.

5. In a machine tool, a work spindle, a chuck on said work spindle, a loading crane movable parallel with the axis of rotation of said work spindle, a hook mounted on said crane for reciprocating radial movement relative to said axis, a bifurcated cradle portion on the end of said hook for engaging a work piece to be loaded or unloaded from said chuck, and a work support in said chuck arranged to pass between the ends of said bifurcated cradle portion when said crane has been moved to insert or remove work from the chuck, said support being arranged to receive said work and remove it from said cradle portion when said hook is moved radially of the axis of said work spindle.

6. In a machine tool, a work spindle, a chuck on said work spindle, a loading crane movable parallel with the axis of rotation of said work spindle, a hook mounted on said crane for reciprocating radial movement relative to said axis, a bifurcated cradle portion on the end of said hook for engaging a work piece to be loaded or unloaded from said work piece, a work support in said chuck arranged to pass between the ends of said bifurcated cradle portion when said crane has been moved to insert or remove work from the chuck, said support being arranged to receive said work and remove it from said cradle portion when said hook is moved radially of the axis of said work spindle and means in said chuck for gripping said work while removing it from engagement with said supporting means.

7. In a device for loading and unloading work in a chuck of a machine tool, a loading crane having a work engaging hook for carrying work axially into said chuck, means for moving said hook perpendicular to said axis fro depositing said work on a support in said chuck, and means in said chuck for gripping said work for machining operations while removing it from engagement with said support.

8. In a center drive lathe, a center drive ring gear rotatably journaled in the frame of said lathe, chucking mechanism in said ring gear, a work support in said ring gear, a rail mounted on said frame, a loading crane movable along said rail, a hook on said crane for carrying a work piece axially in to said ring gear, means in said crane for moving said hook radially of the axis of rotation of said ring gear to deposit said work piece on said work support, and means for operating said chucking mechanism to grip said work piece and remove it from engagement with said work support.

9. In a center drive lathe, a center drive ring gear rotatably journaled in the frame of said lathe, chucking mechanism in said ring gear, a movable work support in said ring gear, a rail mounted on said frame, a loading crane movable along said rail, a hook on said crane for carrying a work piece axially in to said ring gear, means in said crane for moving said hook radially of the axis of rotation of said ring gear to deposit said work piece on said work support, and means on said hook for effecting movement of said support.

10. In a center drive lathe, a pair of center drive ring gears rotatably journaled in the frame of said lathe, chucking mechanism in said ring gear, a work support in each of said ring gears, a rail mounted on said frame, a loading crane movable along said rail, a hook on said crane for carrying a work piece axially into said ring gears, means on said crane for moving said hook radially of the axis of said ring gears to place said work piece on said work support, and means for operating said chucking mechanism to grip said work piece and remove it from engagement with said work supports.

11. In a center drive lathe, a pair of center drive ring gears rotatably journaled in the frame of said lathe, chucking mechanism in said ring gear, a fixed work support in one of said ring gears, a movable work support in the other of said ring gears, a rail mounted on said frame, a loading crane movable along said rail, a hook on said crane for carrying a work piece axially into said ring gears, means on said crane for moving said hook radially of the axis of said ring gears to place said work piece on said work supports, means on said hook to effect movement of said movable work support, and means for operating said chucking mechanism to grip said work piece and remove it from engagement with said work support.

12. In a center drive lathe, a center drive ring gear rotatably journaled in the frame of said lathe, chucking mechanism in said ring gear, work supporting means in said ring gear, a tailstock associated with said ring gear adapted to be moved to and from axial alignment therewith, a rail mounted on said frame, a loading crane movable along said rail, a hook on said crane for carrying a work piece axially into said ring gear, means in said crane for moving said hook radially of the axis of rotation of said ring gear to deposit said work piece on said work support, and means for operating said chucking mechanism to grip said work piece and remove it from engagement with said work support.

13. In a double center drive crankshaft lathe, a pair of center drive ring gears rotatably journaled in the frame of said lathe, chucking mechanism in each of said ring gears, a tailstock movably mounted on the frame of said lathe for movement to and from axial alignment with said center drive ring gears, a rail mounted on said frame, a loading crane movable along said rail, a hook on said crane for carrying a work piece axially into or out of said ring gear when said tailstocks are removed from axial alignment with said chucking devices in said ring gears, means on said crane for moving said hook radially of the axis of said ring gears to place said work piece on said work support, and means for operating said chucking mechanism to grip said work piece and remove it from engagement with said work support.

14. In a double center drive crankshaft lathe, a frame, a pair of center drive ring gears mounted in said frame, chucking mechanism in each of said ring gears, a work support in each of said ring gears, a tailstock movable on said frame to and from axial alignment with said center drive ring gears, a rail movably mounted on said frame, a crane movable along said rail, a hook on said crane for carrying a work piece axially into or out of said center drive ring gears, means for raising and lowering said hook to effect the depositing or removal of said work piece from said supports in said center drive ring gears, and means for moving said rail by the movement of said tailstock when said crane is withdrawn from said ring gears.

15. In a center drive lathe, a frame, a center drive ring gear rotatably mounted in said frame, chucking mechanism in said ring gear, a work support in said ring gear, a pair of movable tailstocks each side of said ring gear arranged for movement to and from axial alignment with said center drive ring gear, a rail mounted on the frame of said lathe, a pair of loading cranes mounted for movement along said rail, work engaging hooks on each of said cranes, arranged one to axially insert work into said chucking mechanism, the hook on said other crane adapted to remove work from said center drive ring gear, means for radially reciprocating said hooks relative to the axis of rotation of said chucking devices for depositing or removing a work piece from said work support in said chucking device.

16. In a lathe, a rotary work spindle, a chuck on said spindle, means for loading work into said chuck comprising a crane travelling along a rail fixed on the frame of said lathe, having a work engaging member for axially inserting or withdrawing work from said chucking device, and means associated with said crane to prevent operation of said work spindle when said crane is in any position other than its fully withdrawn position.

WILLIAM F. GROENE.
HAROLD J. SIEKMANN.